United States Patent
Murakami et al.

(10) Patent No.: US 12,281,019 B2
(45) Date of Patent: Apr. 22, 2025

(54) BORON-CONTAINING AMORPHOUS SILICA POWDER AND METHOD OF PRODUCING SAME

(71) Applicant: SAKAI CHEMICAL INDUSTRY CO., LTD., Sakai (JP)

(72) Inventors: Yasuyuki Murakami, Osaka (JP); Satsuki Motoishi, Osaka (JP); Hisao Koizumi, Osaka (JP); Satoshi Komori, Fukushima (JP); Hironobu Ogata, Fukushima (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 18/247,242

(22) PCT Filed: Sep. 21, 2021

(86) PCT No.: PCT/JP2021/034575
§ 371 (c)(1),
(2) Date: Mar. 29, 2023

(87) PCT Pub. No.: WO2022/071021
PCT Pub. Date: Apr. 7, 2022

(65) Prior Publication Data
US 2023/0365419 A1   Nov. 16, 2023

(30) Foreign Application Priority Data
Oct. 1, 2020   (JP) .................... 2020-167312

(51) Int. Cl.
*C01B 33/193*   (2006.01)
(52) U.S. Cl.
CPC ........ *C01B 33/193* (2013.01); *C01P 2002/02* (2013.01); *C01P 2002/54* (2013.01);
(Continued)

(58) Field of Classification Search
CPC ...... C04B 2235/365; C04B 2235/5454; C03C 12/00; C03C 2214/04; C03C 4/16
See application file for complete search history.

(56) References Cited

U.S. PATENT DOCUMENTS 5,683,528 A * 11/1997 Partlow .................. B32B 18/00
501/12
10,562,809 B2    2/2020 Gleason et al.
(Continued)

FOREIGN PATENT DOCUMENTS

AU    2020101112    7/2020
CN    101648816    2/2010
(Continued)

OTHER PUBLICATIONS

International Search Report issued in International Application No. PCT/2021/034575, Nov. 30, 2021, 5 pages w/translation.

*Primary Examiner* — Alexandre F Ferre
(74) *Attorney, Agent, or Firm* — HSML P.C.

(57) ABSTRACT

An amorphous silica powder comprising boron atoms. The amorphous silica powder comprising boron atoms has an average particle size from 10 to 100 nm, as determined from 40 particles selected at random in a transmission electron micrograph. The amorphous silica powder comprising boron atoms has a decrement in a boron content of 10 mass % or less, when fired under the following conditions: 5 to 10 g of a dried product of the boron-containing amorphous silica powder is filled into an alumina crucible, heated in the atmosphere at 200° C./hour to 1000° C. to 1100° C., maintained as it is for 5 hours, and cooled to room temperature.

12 Claims, 2 Drawing Sheets

(52) U.S. Cl.
CPC ...... *C01P 2002/88* (2013.01); *C01P 2004/04* (2013.01); *C01P 2004/64* (2013.01); *C01P 2006/12* (2013.01)

(56) References Cited

U.S. PATENT DOCUMENTS

| | | | | |
|---|---|---|---|---|
| 2008/0086951 | A1* | 4/2008 | Wakamiya | C09G 1/02 |
| | | | | 516/9 |
| 2012/0138215 | A1 | 6/2012 | Kim et al. | |
| 2019/0135683 | A1* | 5/2019 | Gleason | C04B 35/14 |

FOREIGN PATENT DOCUMENTS

| | | |
|---|---|---|
| CN | 110302381 | 10/2019 |
| JP | 59-102832 | 6/1984 |
| JP | 7-172814 | 7/1995 |
| JP | 2001-176329 | 6/2001 |
| JP | 2007-161518 | 6/2007 |
| JP | 2007-261860 | 10/2007 |
| JP | 2007-261861 | 10/2007 |
| JP | 2008-169102 | 7/2008 |
| JP | 2008-184351 | 8/2008 |
| JP | 2009-538816 | 11/2009 |
| JP | 2011-068507 | 4/2011 |
| JP | 2019-108263 | 7/2019 |
| WO | 2007/141196 | 12/2007 |

* cited by examiner

BORON-CONTAINING AMORPHOUS SILICA POWDER AND METHOD OF PRODUCING SAME

TECHNICAL FIELD

The present invention relates to a boron-containing amorphous silica powder and a method for producing the same. More specifically, the present invention relates to a boron-containing amorphous silica powder that can be suitably used as a material of porcelains or the like having excellent high-frequency characteristics and a method for producing same.

BACKGROUND ART

Materials for circuit boards mounted on small communication devices and electronic devices used at high frequencies of the GHz band are required to have low dielectric constant (ε) and low dielectric loss tangent (tan), or in other words, to be low loss materials having excellent high frequency transmission characteristics. Further, as electronic components such as circuit boards and capacitors become more sophisticated and smaller, constituent materials of the peripheral parts (such as adhesive, resist inks, and sealing materials) of circuit boards are also required to have low dielectric constant and low dielectric loss tangent in the frequency band used. In particular, state-of-the-art logic LSIs (Large Scale Integrated Circuits) are being highly integrated in order to improve their performance. However, high integration (miniaturization) increases wiring resistance and wiring capacitance, leading to an increase in wiring delay time. Therefore, materials with low dielectric constant and low dielectric loss tangent are required.

In order to achieve a low dielectric constant, for example, a technique involving use of low-melting-point glass has been developed, but it was not sufficient for high-frequency material applications due to its low Q value.

Among conventional ceramic multilayer wiring boards, the most popular type has an alumina sintered body serving as an insulating substrate and a wiring layer made of a high melting point metal, such as tungsten and molybdenum, formed on the surface or the inside of the insulating substrate. Moreover, the frequency band used has recently shifted to the high frequency side along with the advanced information age. In such a high frequency wiring board, it is required that the resistance of the conductor forming the wiring layer is small, and also that the dielectric loss of the insulation substrate in the high frequency region is small, in order to transmit high frequency signals without loss.

However, conventional high melting point metals such as tungsten and molybdenum have large conductor resistance, slow signal propagation speed, and difficulty in signal propagation in the high frequency region. For example, in high-frequency wiring boards to which high-frequency signals in the millimeter wave range of 30 GHz or more are applied, the aforementioned high melting point metals cannot be used, and it is necessary use low resistance metals such as copper, silver, and gold instead of the high melting point metals. However, these low resistance metals have low melting points and thus cannot be fired simultaneously with ceramics such as alumina. Therefore, techniques involving use of silica have been developed to enable simultaneous firing at low temperatures (see Patent Literatures 1 and 2).

In order to further reduce the dielectric loss tangent and dielectric loss, techniques involving doping silica with an element, for example, boron have been developed (see Patent Literatures 3 to 5).

CITATION LIST

Patent Literature

Patent Literature 1: JP 2007-161518 A
Patent Literature 2: JP 2001-176329 A
Patent Literature 3: JP 2008-184351 A
Patent Literature 4: JP 2011-68507 A
Patent Literature 5: JP 2019-108263 A

SUMMARY OF INVENTION

Technical Problem

As described above, various boron-doped silicas have been conventionally developed, but conventional boron-doped silicas have not been satisfactory in terms of low temperature sinterability.

The present invention has been made under the above-described circumstances, and an object thereof is to provide a boron-containing amorphous silica powder more excellent in terms of low temperature sinterability than conventional silica powders.

Solution to Problem

As a result of various studies on boron-containing amorphous silica powders, the inventors have found that a boron-containing amorphous silica powder having a decrement in boron content of 10 mass % or less when fired under predetermined conditions is excellent in terms of low temperature sinterability, and can be splendidly solved the aforementioned problem, thereby arriving at the present invention.

Specifically, the present invention is amorphous silica powder containing boron atoms, the boron-containing amorphous silica powder having an average particle size of 10 to 100 nm, as determined from 40 particles selected at random in a transmission electron micrograph, the boron-containing amorphous silica powder having a decrement in a boron content of 10 mass % or less, when fired under the following conditions:

<Firing Conditions>

5 to 10 g of a dried product of the boron-containing amorphous silica powder is filled into an alumina crucible, heated in the atmosphere at 200° C./hour to 1000° C. to 1100° C., maintained as it is for 5 hours, and cooled to room temperature.

Preferably, proportions of $SiO_2$ and $B_2O_3$ are 90.0 to 99.8 mass % and 0.2 to 10.0 mass %, respectively, in 100 mass % of a total of $SiO_2$ and $B_2O_3$, all in terms of oxide, in the boron-containing silica powder.

Preferably, the boron-containing amorphous silica powder has a coefficient of variation of the particle size, standard deviation of particle size/average particle size, of 0.25 or less, as determined from 40 particles selected at random in a transmission electron micrograph.

Preferably, the boron-containing amorphous silica powder has an average circularity of 0.65 or more, as determined by the following method:

<Determination Method of Average Circularity> a file of a TEM image captured under a transmission electron microscope is read by an image analysis software, and an average circularity of 100 to 200 particles is determined by running an application for particle analysis.

Preferably, proportions of $SiO_2$ and $B_2O_3$ are 90.0 to 99.8 mass % and 0.2 to 10.0 mass %, respectively, in 100 mass % of a total of $SiO_2$ and $B_2O_3$, all in terms of oxide, when the boron-containing amorphous silica powder is fired under the aforementioned conditions.

Preferably, when the boron-containing amorphous silica powder is fired under the aforementioned conditions, the fired product has a specific surface area of 5 $m^2$/g or less, as measured by the following method:

<Measurement Method of Specific Surface Area>
  Equipment used: automatic specific surface area analyzer;
  Method: BET method;
  Atmosphere: nitrogen gas ($N_2$); and
  Deaeration conditions for external deaerator: 200° C. for 60 minutes.

Preferably, the boron-containing amorphous silica powder is fired under the aforementioned conditions, the fired product has a relative dielectric constant ε at 1 GHz of 5 or less and a Q value of 1000 or more.

The present invention is also a method for producing the boron-containing amorphous silica powder according to any one of claims 1 to 7, the method including:
  step (A) of obtaining seed particles containing silicon atoms;
  step (B) of mixing the seed particles containing silicon atoms obtained in step (A), a silicon atom-containing compound different from the seed particles obtained in step (A), and a boron atom-containing compound; and
  step (C) of drying the product obtained in step (B).

Preferably, the amount of the boron atom-containing compound used is 0.4 to 10 mol %, in terms of the number of boron atoms, based on 100 mol % of a total of silicon atoms in the seed particles containing silicon atoms and the silicon atom-containing compound different from the seed particles.

Preferably, the amount of the seed particles containing silicon atoms used is 1 to 20 mol %, in terms of the number of silicon atoms, based on 100 mol % of a total of silicon atoms in the seed particles containing silicon atoms and the silicon atom-containing compound different from the seed particles.

Preferably, in step (B), a basic catalyst is added in an amount of 10 to 50 mol % based on 100 mol % of a total of silicon atoms in the silicon atom-containing compound different from the seed particles and boron atoms in the boron atom-containing compound.

The present invention is also a fired product of the boron-containing amorphous silica powder according to any one of claims 1 to 7.

Advantageous Effects of Invention

The boron-containing amorphous silica powder of the present invention, which has the aforementioned configurations, is excellent in terms of low temperature sinterability, and it can be thus suitably used for materials for ceramic multilayer wiring boards.

DESCRIPTION OF EMBODIMENTS

Figure 1:
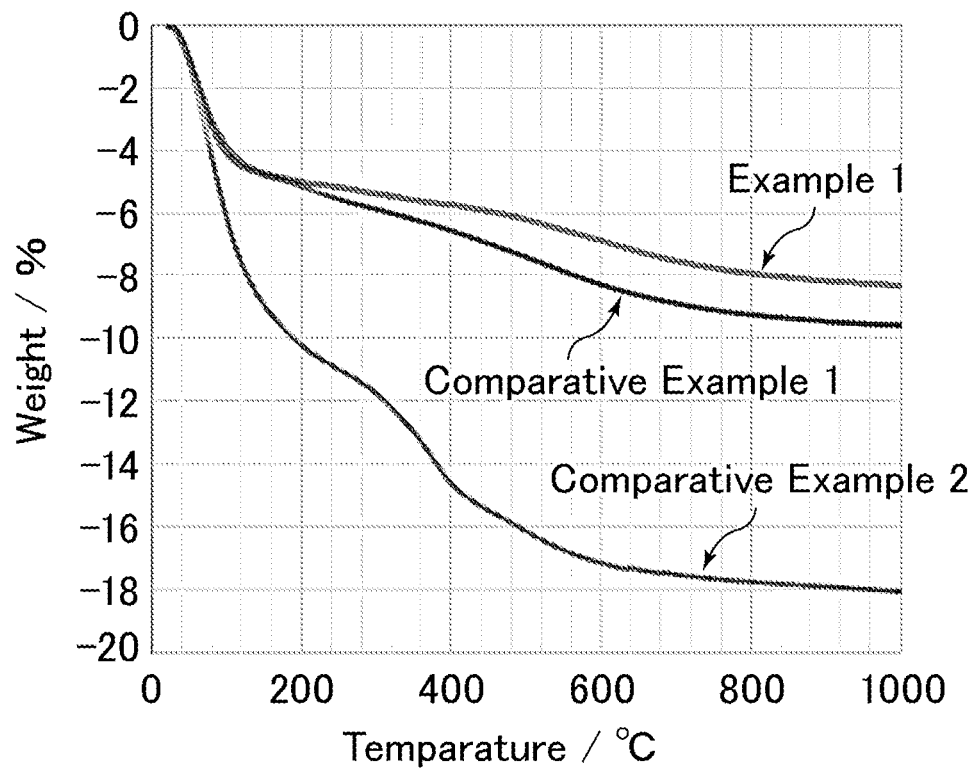
FIG. 1 shows the results of TG analysis for the dry powder 1 obtained in Example 1 and the comparative dry powders 1 and 2 obtained in Comparative Examples 1 and 2.

Hereinafter, preferable embodiments of the present invention will be specifically described, but the present invention is not limited only to the following descriptions and can be appropriately modified without departing the spirit of the present invention.

An embodiment in which two or more of the preferable embodiments of the present invention described below are combined is also a preferable embodiment of the present invention.

<Boron-Containing Amorphous Silica Powder>

The boron-containing amorphous silica powder of the present invention has an average particle size of 10 to 100 nm, as determined from 40 particles selected at random in a transmission electron micrograph, and a decrement in the boron content of 10 mass % or less, when fired under the aforementioned conditions.

The boron-containing amorphous silica powder of the present invention has less decrement in the boron content when fired, and the specific surface area of the powder after sintering can be sufficiently decreased. Accordingly, it is excellent in terms of low temperature sinterability. Further, since the boron-containing amorphous silica powder has excellent binding properties between boron and silica to sufficiently confine boron inside the particles, volatilization of boron can be sufficiently suppressed, which can sufficiently suppress variations in composition when used as a substrate or the like and the occurrence of failure due to volatilized boron.

In the boron-containing silica powder, the proportions of $SiO_2$ and $B_2O_3$ are preferably 90.0 to 99.8 mass % and 0.2 to 10.0 mass %, respectively, in a total of 100 mass % of $SiO_2$ and $B_2O_3$, all in terms of oxide. This allows the boron content in the silica powder to be more sufficient and therefore the low temperature sinterability thereof to be more excellent.

When the proportion of $B_2O_3$ is 10.0 mass % or less, the durability of an electronic device is further improved when the boron-containing silica dispersion is used as a material of electronic parts thereof such as multilayer ceramic capacitors (MLCCs).

The proportion of $B_2O_3$ is preferably 1.0 to 8.0 mass %, more preferably 2.0 to 6.0 mass %, further preferably 2.5 to 5.0 mass %.

The aforementioned proportions of $SiO_2$ and $B_2O_3$ each can be determined by the method described in EXAMPLES.

In the boron-containing silica powder, the proportion of $SiO_2$ is preferably 92 to 99 mass %, more preferably 93 to 97 mass %, further preferably 94 to 96 mass %.

The boron-containing silica powder has an average particle size (hereinafter also referred to as TEM average particle size) of 10 to 100 nm, as determined from 40 particles in a transmission electron micrograph.

The TEM average particle size is a primary particle size. When the primary particle size is 100 nm or less, the particle size is equal to or smaller than that of ceramic powders such as submicron dielectric powders used, for example, for multilayer ceramic capacitors, and accordingly, the particles can be dispersed when mixed with such ceramic powder so as to be easily fitted in the grain boundaries of the ceramic powder, to form a more uniform and thinner grain boundary phase between particles of the ceramic powder.

The TEM average particle size is preferably 15 to 75 nm, more preferably 20 to 50 nm, further preferably 25 to nm.

The boron-containing silica powder preferably has an average particle size $D_{50}$ of 10 to 100 nm in the particle size distribution thereof, as determined by the following method. The average particle size $D_{50}$ is more preferably 15 to 75 nm, further preferably 20 to 50 nm, particularly preferably 25 to 30 nm.

<Determination Method of Particle Size Distribution>

The volume-based average particle size is measured using a dynamic light scattering particle size distribution analyzer. A slurry containing boron-containing amorphous silica particles is appropriately diluted with ion-exchanged water so that the particle concentration at the time of measurement is a suitable concentration (in the range of loading index=0.01 to 1).

The measurement time is 60 seconds.

Permeability of particle: permeable, refractive index of particle: 1.46, shape: perfect sphere, density (g/cm$^3$): 1.00, solvent: water, refractive index: 1.333, viscosity at 30° C.: 0.797, and viscosity at 20° C.: 1.002.

The 50th percentile of the particle size in the volume-based particle size distribution curve obtained is defined as the average particle size $D_{50}$ (nm).

The boron-containing amorphous silica powder preferably has an average coefficient of variation of the particle size, standard deviation/average particle size determined from 40 particles in a transmission electron micrograph, of 0.25 or less. This can sufficiently suppress variations in particle size and allows the particles to be uniformly dispersed in other materials, while a deterioration in fluidity and formability when mixed with other materials such as dielectric powder is sufficiently suppressed. The variation coefficient is more preferably 0.1 or less.

The boron-containing amorphous silica powder preferably has $D_{90}/D_{10}$ of 4.0 or less in the aforementioned particle size distribution. The $D_{10}$ means a 10th percentile of the particle size on a volume basis, and the $D_{90}$ means a 90th percentile of the particle size on a volume basis.

$D_{90}/D_{10}$ is an index of the sharpness of the volume-based particle size distribution. As the value of $D_{90}/D_{10}$ increases, the particle size distribution is broader, and as the value decreases, the particle size distribution is sharper. When $D_{90}/D_{10}$ is 4.0 or less, the variation in particle size is sufficiently suppressed. Owing to this, the particles can be dispersed more uniformly in other materials, and also, poor fluidity and formability when mixed with other materials such as dielectric powder is sufficiently suppressed.

The boron-containing amorphous silica powder preferably has a $D_{100}$ of 300 nm or less. It is more preferably 200 nm or less, further preferably 100 nm or less.

An embodiment of the boron-containing amorphous silica powder in which $D_{90}/D_{10}$ is 4.0 or less with a $D_{100}$ of 300 nm or less in the particle size distribution is one of preferable embodiments of the present invention.

The boron-containing amorphous silica powder preferably have an average circularity of 0.65 or more, as determined by the above-described method. This allows the particles to be dispersed more uniformly in other materials, and also sufficiently suppressed poor fluidity and formability when mixed with other materials such as dielectric powder. Further, this enables suppression of the wear of the molding die when molding the resin.

When the boron-containing amorphous silica powder is fired under the aforementioned conditions, the fired product preferably has a specific surface area of 5 m$^2$/g or less, more preferably 3 m$^2$/g or less, as measured by the aforementioned method.

The specific surface area of the boron-containing amorphous silica powder (before firing) is not limited but is preferably 150 m$^2$/g or less, more preferably 100 to 140 m$^2$/g, further preferably 110 to 130 m$^2$/g.

When the boron-containing amorphous silica powder is fired under the aforementioned conditions, the fired product preferably has a relative dielectric constant 6 at 1 GHz of 5 or less, more preferably 4 or less, further preferably 3 or less. The relative dielectric constant can be measured by the method described in EXAMPLES.

When the boron-containing amorphous silica powder is fired under the aforementioned conditions, the fired product preferably has a Q value at 1 GHz of 1000 or more. When such a boron-containing amorphous silica powder is used in a multilayer ceramic capacitor (MLCC) or the like, loss is reduced, and accordingly such a boron-containing amorphous silica powder is preferable. The Q value is more preferably 1500 or more, further preferably 2000 or more. The Q value can be measured by the method described in EXAMPLES.

<Method for Producing Boron-Containing Amorphous Silica Powder>

The method for producing the boron-containing amorphous silica powder of the present invention is not limited, but a boron-containing silica dispersion can be produced by performing a step of obtaining seed particles containing silicon atoms, and mixing the seed particles obtained, a silicon atom-containing compound different from the seed particles, and a boron atom-containing compound, followed by drying.

The present invention is also a method for producing a boron-containing amorphous silica powder, the method including a step (A) of obtaining seed particles containing silicon atoms, a step (B) of mixing the seed particles containing silicon atoms obtained in step (A), a silicon atom-containing compound different from the seed particles obtained in step (A), and a boron atom-containing compound, and a step (C) of drying the product obtained in step (B).

In step (B), use of the seed particles containing silicon atoms enables the boron-containing amorphous silica powder to be uniformly doped with boron.

The "silicon atom-containing compound different from the seed particles" used in step (B) may have the same composition of the compound as that of the seed particles, as long as it is a material other than the seed particles obtained in step (A).

In the method for producing a boron-containing amorphous silica powder, boron that has deposited from the boron atom-containing compound is preferably reacted with a hydrolysate of the silicon atom-containing compound for production. Since the hydrolysis rate of the silicon atom-containing compound is lower than the deposition rate of boron, they usually deposit as separate particles. However, it is considered that when the seed particles containing silicon atoms is used, the seed particles serves as reaction fields, and that the silicon atom-containing compound different from the seed particles is hydrolyzed to allow the particles to grow while involving boron, whereby the particles can be uniformly doped with boron.

Step (A) is not limited as long as the seed particles containing silicon atoms are obtained, but step (A) is preferably a step of decomposing the silicon-containing compound.

The silicon-containing compound used in step (A) is not limited but is preferably silicon alkoxide or the like.

In the case of using silicon alkoxide in step (A), the silicon alkoxide is hydrolyzed to generate silicon dioxide, orthosilicic acid, metasilicic acid, metadisilicic acid, or the like, as the seed particles.

Preferable examples of the silicon alkoxide include methyl silicates such as tetramethoxysilane; ethyl silicates such as tetraethoxysilane; and isopropyl silicates such as tetraisopropoxysilane. Among them, ethyl silicates are preferable, and tetraethoxysilane (TEOS) is more preferable.

The average particle size of the seed particles containing silicon atoms obtained in step (A) is not limited, but the average particle size is preferably 5 to 15 nm, more preferably 10 to 13 nm, as determined from 40 particles in a transmission electron micrograph.

Also, the average particle size $D_{50}$ in the particle size distribution measured by the aforementioned method is preferably 1 to 15 nm, more preferably 5 to 10 nm.

In step (A), preferably, the silicon alkoxide, water, and a catalyst are reacted.

The catalyst is preferably a basic catalyst, more preferably, basic amino acids such as arginine, lysine, histidine, and tryptophan, further preferably arginine. Use of arginine enables smaller seed particles to be obtained.

In step (A), the amount of the catalyst used is not limited but is preferably 0.5 to 3 mol %, more preferably 1.5 to 2.5 mol %, based on 100 mol % of the silicon alkoxide.

In step (A), the reaction temperature is not limited but is preferably 40° C. to 70° C., more preferably 55° C. to 65° C.

In step (A), the method for adding the raw materials is not limited, but the silicon alkoxide is preferably added to a mixture of water and the catalyst.

In step (B), the amount of the seed particles containing silicon atoms used is preferably 1 to 20 mol %, in terms of the number of silicon atoms, based on 100 mol % of a total of silicon atoms in the seed particles containing silicon atoms and the silicon atom-containing compound different from the seed particles. When the amount of the seed particles used is 1 mol % or more, an excessive increase in particle size of the particles to be finally obtained can be sufficiently suppressed. Further, when the amount of the seed particles used is 1 mol % or more, the growth rate of the seed particles relative to the hydrolysis rate of the silicon atom-containing compound different from the seed particles falls within a more suitable range, so that formation of new particles on other location than the seed particles can be suppressed, and a broad particle size distribution can be thus sufficiently suppressed. When the amount used is 20 mol % or less, the silicon atom-containing compound different from the seed particles can be sufficiently hydrolyzed.

The amount of the seed particles used is more preferably 5 to 20 mol %, further preferably 10 to 15 mol %.

In step (B), the amount of the boron atom-containing compound used is preferably 1 to 10 mol %, in terms of the number of boron atoms, based on 100 mol % of a total of silicon atoms in the seed particles containing silicon atoms and the silicon atom-containing compound different from the seed particles. When the amount of the boron atom-containing compound used is 10 mol % or less, formation of borate, and agglomeration and sedimentation thereof can be sufficiently suppressed. Further, when the amount of the boron atom-containing compound used is 10 mol % or less, the remaining of the unreacted boron atom-containing compound can be sufficiently suppressed, and agglomeration of the unreacted boron atom-containing compound can also be sufficiently suppressed.

The amount of the boron atom-containing compound used is more preferably 1 to 5 mol %, further preferably 2 to 3 mol %.

In step (B), a basic catalyst is preferably used.

By doing so, the dispersibility in the reaction solution can be sufficiently enhanced and the viscosity can be sufficiently decreased by addition of a base, in addition to actions as a catalyst.

The basic catalyst is not limited, but examples thereof include ethylenediamine, diethylenetriamine, triethylenetetramine, ammonia, urea, ethanolamine, tetramethyl ammonium hydroxide, and the aforementioned basic amino acids.

The basic catalyst is preferably ammonia or a basic amino acid, more preferably ammonia or arginine. By using ammonia, particles having a shape closer to the spherical shape can be obtained. By using arginine, particles having a smaller particle size can be obtained.

An embodiment in which two or more basic catalysts are used is preferred. An embodiment in which ammonia and arginine are used in combination as basic catalysts is one of the preferable embodiments of the present invention.

In step (B), the amount of the basic catalyst used is preferably 10 to 50 mol %, based on 100 mol % of a total of silicon atoms in the silicon atom-containing compound different from the seed particles and boron atoms in the boron atom-containing compound. When the amount of the basic catalyst used is 50 mol % or less, the necking involving surrounding particles due to an excessive promotion of the growth reaction of the particles can be sufficiently suppressed, and therefore the particles can be sufficiently suppressed from excessively increasing to settle.

The amount of the basic catalyst used is more preferably 20 to 40 mol %, further preferably 25 to 35 mol %.

In the case of using ammonia as a basic catalyst, the amount used is preferably 10 to 50 mol %, based on 100 mol % of a total of silicon atoms in the silicon atom-containing compound different from the seed particles and boron atoms in the boron atom-containing compound.

When the amount of ammonia used is 10 mol % or more, the dispersibility can be improved more to sufficiently suppress the sedimentation of the particles. When the amount of ammonia used is 50 mol % or less, generation of ammonium borate can be sufficiently suppressed, and agglomeration due to this can be sufficiently suppressed. The amount of ammonia used is more preferably 20 to 40 mol %, further preferably 25 to 35 mol %.

In step (B), the silicon atom-containing compound different from the seed particles is not limited as long as it is different from the seed particles obtained in step (A) and contains silicon atoms, but it is preferably the aforementioned silicon alkoxide. It is more preferably an ethyl silicate, further preferably tetraethoxysilane (TEOS).

In step (B), the boron atom-containing compound is not limited as long as it contains boron atoms, and examples thereof include boron alkoxides; boron oxides; and boron oxoacids such as metaboric acid and orthoboric acid. Preferred among these are boron alkoxides.

Examples of the boron alkoxides preferably include methyl borates such as trimethoxyborane; ethyl borates such as triethoxyborane; and isopropyl borates such as triisopropoxyborane. Among them, ethyl borates are preferable, and triethoxyborane (TEOB) is more preferable.

In step (B), a solvent is preferably used. Examples of the solvent preferably include water, and alcohols having 1 to 3 carbon atoms such as methanol, ethanol, and isopropyl alcohol. It is more preferably a mixed solvent of water and the alcohol.

The alcohols are preferably ethanol.

In the case of using a mixed solvent of water and the alcohol as the solvent, the proportion of the alcohol is preferably 140 to 150 mass %, more preferably 143 to 147 mass %, to 100 mass % of water.

In step (B), the method for adding the raw materials is not limited, but step (B) preferably includes substep (B1) of mixing a solvent, the seed particles, and a basic catalyst, and substep (B2) of adding a silicon atom-containing compound different from the seed particles and a boron atom-containing compound to the mixed solution obtained in substep (B1).

The temperature in substep (B1) is not limited but is preferably 20° C. to 30° C.

In substep (B1), stirring is preferably performed.

In substep (B2), the method for adding the silicon atom-containing compound and the boron atom-containing compound is not limited, and these may be separately added or may be mixed before addition. An embodiment in which they are mixed before addition is preferable.

In substep (B2), the silicon atom-containing compound and the boron atom-containing compound may be added at a time or sequentially but is preferably added sequentially.

In substep (B2), the silicon atom-containing compound and the boron atom-containing compound may be added as solids or a solution but are preferably added as a solution.

It is preferable to add a mixed solution of the silicon atom-containing compound and the boron atom-containing compound dropwise to the mixed solution obtained in substep (B1).

The dropping time is not limited, but it is preferably 2 to 4 hours, more preferably 2 hours.

In substep (B2), the temperature is not limited but is preferably 45° C. to 65° C.

In substep (B2), stirring is preferably performed.

In the method for producing the boron-containing amorphous silica powder of the present invention, an aging step is preferably performed after step (B).

The aging temperature is not limited but is preferably 20° C. to 30° C.

The aging time is not limited but is preferably 12 to 16 hours.

The method for producing the boron-containing amorphous silica powder of the present invention may include a concentration step after step (B) or the aging step.

The concentration method in the concentration step is not limited, and examples thereof include addition a flocculant followed by suction filtration; and ultrafiltration.

Examples of the flocculant include ammonia water, acids, and polymer flocculants. Preferably, the flocculant is ammonia water or acetic acid.

In the concentration step, ultrafiltration is preferable.

Since the boron-containing amorphous silica powder of the present invention has high binding properties between boron and silica, the proportion of $B_2O_3$ can be maintained even after ultrafiltration.

The drying step (C) in the method for producing the boron-containing amorphous silica powder of the present invention is not limited, as long as the solvent is evaporated from the product obtained in step (B) to dry it. For example, a box dryer or the like is preferably used for drying.

The drying temperature is not limited, and it can be performed at 80° C. to 150° C.

The drying time is not limited and is generally 10 to 24 hours, preferably 12 to 18 hours.

<Fired Product>

Since the boron-containing amorphous silica powder of the present invention is excellent in terms of low temperature sinterability, a fired product of the boron-containing amorphous silica powder can be suitably used for ceramic materials such as ceramic multilayer wiring boards. Further, since the boron-containing amorphous silica powder has low relative dielectric constant and high Q value, a fired product of the boron-containing amorphous silica powder can be particularly suitably used for ceramic materials such as high frequency ceramic multilayer wiring boards and MLCCs.

The present invention is also a fired product of the boron-containing amorphous silica powder.

<Sintering Aid for Ceramic Materials>

Since the boron-containing amorphous silica powder of the present invention contains boron and is excellent in terms of low temperature sinterability, it can be suitably used as a sintering aid for ceramic materials such as ceramic multilayer wiring boards. It is particularly preferable to use it as a sintering aid for ceramic materials such as high frequency ceramic multilayer wiring boards.

The present invention is also a sintering aid containing the boron-containing amorphous silica powder of the present invention.

EXAMPLES

Hereinafter, the present invention will be described further in detail by way of examples, but the present invention is not limited to these examples. The symbol "%" means "mold", unless otherwise noted.

1. Various Measurements were Performed as Follows.
(1) Average Particle Size in Particle Size Distribution On the slurry obtained in each of Examples and Comparative Examples, the particle size distribution was determined using a dynamic light scattering particle size distribution analyzer (Nanotrac Wavell UT151, manufactured by MicrotracBEL Corp.).

A slurry containing boron-containing amorphous silica particles was appropriately diluted with ion-exchanged water so that the particle concentration at the time of measurement was a suitable concentration (in the range of loading index=0.01 to 1). In the case where a sample contained solids sedimented, the sample bottle was immersed in an ultrasonic cleaner (ASU-10, manufactured by AS ONE CORPORATION) for ultrasonic treatment for 10 minutes, to prepare a suspension of the sample.

The measurement time was 60 seconds.

Permeability of particle: permeable, refractive index of particles: 1.46, shape: perfect sphere, density (g/cm$^3$): 1.00, solvent condition: water, refractive index: 1.333, viscosity at 30° C.: 0.797, and viscosity at 20° C.: 1.002.

(2) Particle Size Analysis by Microscopy

The synthetic slurry obtained in each of Examples and Comparative Examples were subjected to particle size analysis. Using a field emission scanning electron microscope (JSM-7000F, manufactured by JEOL Ltd.) or a transmission electron microscope (JSM-2100F, manufactured by JEOL Ltd.), the sample was captured at a magnification such that at least 100 or more particles were seen in an image. The file of the captured image was read by an image analysis software (Eizo-kun, manufactured by Asahi Kasei Engineering Corporation), and the particle sizes of 40 particles with clear contours were measured by running an application for a circular particle analysis.

(i) Observation with SEM

A drop of the solution was placed on a sample table with a micro spatula, followed by drying at 105° C. for 2 to 3 minutes. The sample obtained was coated for 60 seconds using a platinum coater (JFC-1600, manufactured by JEOL Ltd.).

The coated sample was observed under a field emission scanning electron microscope. The measurement conditions were as follows.

Acceleration voltage: 15.00 kV and WD: 10 mm.

(ii) Observation with TEM

A microgrid without support films (manufactured by JEOL Ltd., drawing number standard: CV 200MESH) was used. The cells of the microgrid were immersed in a slurry to be analyzed, excess moisture adhering to the cells was removed, and the cells were completely dried with a hair dryer. The dried sample was observed under a transmission electron microscope.

(3) Thermal Weight Loss Analysis

The silica dry powder obtained in each of Examples and Comparative Examples was subjected to weight loss analysis in the firing process using a thermal analyzer (Thermo plas EVO TG 8120, manufactured by Rigaku Corporation). The measurement conditions were as follows. Reference: alumina, sample pan: platinum, sample weight: 10 mg, atmosphere: air, measurement temperature range: 25° C. to 1000° C., and heating rate: 10.0° C./min.

(4) Elemental Analysis (Determination of Boron Content and Decrement)

The silica dry powder and the silica fired product (fired powder) obtained in each of Examples and Comparative Examples were subjected to elemental analysis by a contained element-scanning function, EZ scanning, of an X-ray fluorescence analyzer (model number: ZSX PrimusII, manufactured by Rigaku Corporation).

Specifically, each pressed sample was set on the measurement sample stage, and the following conditions were selected: measurement range: B-U, measurement size: 30 mm, sample mode: metal, measurement time: standard, and atmosphere: vacuum), to measure the content of Si and the content of B in the powder. The found values obtained were converted into the contents of oxides to obtain the contents of $SiO_2$ and $B_2O_3$. Based on the Si content and the B content in the powder, the content of $B_2O_3$ (parts by weight) was calculated based on 100 parts by weight of the sum of the converted amount of $SiO_2$ and the converted amount of $B_2O_3$ in the powder. Table 1 show the results.

Since the fired powder alone cannot be molded by pressing, it was mixed with a PVA solution and granulated to facilitate pressure molding. Specifically, a 10 wt % PVA aqueous solution was added little by little, so that the amount of PVA would be 0.8 to 1.5 wt % based on the fired powder, and the resultant was mixed in a mortar until the whole was uniform. The mixed powder was dried at 110° C. for 1 hour and de-agglomerated in a mortar. It was passed through a sieve with a mesh size of about 150 μm to obtain a sample for XRF analysis of the fired powder.

The boron decrement was determined by the following formula.

Boron decrement (%)=($B_2O_3$ content in silica dry powder−$B_2O_3$ content in silica fired product)/ ($B_2O_3$ content in silica dry powder)×100

(5) Measurement of Specific Surface Area (SSA)

The firing powder obtained in each of Examples and Comparative Examples was subjected to BET measurement using a specific surface area analyzer (Gemini VII2390, manufactured by Micromeritics Instrument Corp.). The powder was weighed, and pretreated at 200° C. for 1 hour while being filled with nitrogen gas. The thus obtained amount of the sample here was used as a measurement sample in the measurement.

(6) Measurement of Relative Dielectric Constant and Q Value

On the firing powder obtained in each of Examples and Comparative Examples, the relative dielectric constant and Q value (quality factor) were measured using a cavity resonator, manufactured by AET, INC. and a network analyzer (Keysight Streamline VNA), manufactured by Keysight Technologies. A glass cell for measurement at 1 GHz was filled with the powder for measurement to a height 60 mm in the cell, and the measurement was performed at 1 GHz.

2. Preparation of Silica Dry Powder and Fired Product

Example 1

(i) Preparation of Seed Particles (Seeds)

Ion-exchanged water (5361.5 g) and L(+)-arginine (10.5 g, manufactured by Wako Pure Chemical Industries, Ltd.) were mixed and heated to 60° C. using a heater. After stirring at 150 rpm, an ethyl orthosilicate (628.0 g, manufactured by TAMA CHEMICALS CO., LTD.) was added thereto. 7 hours after the addition of ethyl orthosilicate, heating was stopped, and a seed slurry 1 was collected about 16 hours after heating was stopped. The seed slurry 1 obtained was transparent with no sediments.

(ii) Preparation of Silica Dispersion

Ion-exchanged water (1368.5 g), an industrial alcohol preparation (Alcosol P-5, 1376.1 g, manufactured by AMAKASU CHEMICAL INDUSTRIES), and the seed slurry 1 (997.2 g) were mixed. Further, L(+)-arginine (1.33 g) and 25% ammonia water (81.0 g, manufactured by Taiseikakou Co., Ltd.) were added, and the solution temperature was raised to 55° C. using a heater. The solution was stirred at 750 rpm, and a mixed solution containing ethyl orthosilicate (675.9 g) and triethyl borate (26.2 g, manufactured by Tokyo Chemical Industry Co., Ltd.) was added thereto over 240 minutes. The solution gradually became cloudy, and finally a translucent slurry 1 was obtained. Thereafter, the slurry 1 was washed with water in an amount of 6 times the liquid volume using an UF film module "Microza" type ACP-1013D, manufactured by Asahi Kasei Corporation (fraction molecular weight of the ultrafiltration film: 13,000) at a flow rate of a liquid fed of 3660 ml/minute, to thereby obtain a silica dispersion 1. The silica particles in the silica dispersion 1 obtained were amorphous.

(iii) Preparation of Silica Dry Powder

The slurry 1 was washed with water by ultrafiltration to obtain a dispersion, and the dispersion was transferred to an evaporating dish and dried overnight at 105° C. to remove moisture, thereby obtaining silica dry powder 1.

(iv) Preparation of Silica Fired Product (Fired Powder)

20 g of the silica dry powder 1 de-agglomerated in a mortar was filled into an alumina crucible, heated to 1100° C. at 200° C./hour in the atmosphere, maintained for 5 hours as it was, and then cooled to room temperature. The fired product thus obtained was de-agglomerated in a mortar, to obtain a silica fired product 1. The silica fired product 1 obtained was amorphous. Further, the silica dry powder 1 and the silica fired product (fired powder) 1 were subjected to elemental analysis, and as a result, the boron decrement was 8.3%.

Example 2

(i) Preparation of Seed Particles (Seeds)

Ion-exchanged water (5361.5 g) and L(+)-arginine (10.5 g, manufactured by Wako Pure Chemical Industries, Ltd.) were mixed and heated to 60° C. using a heater. After stirring at 150 rpm, an ethyl orthosilicate (628.0 g, manufactured by TAMA CHEMICALS CO., LTD.) was added thereto. 7 hours after the addition of ethyl orthosilicate, heating was stopped, and a seed slurry 2 was collected about 16 hours after heating was stopped. The seed slurry 2 obtained was transparent with no sediments.

(ii) Preparation of Silica Dispersion

Ion-exchanged water (1368.5 g), an industrial alcohol preparation (Alcosol P-5, 1376.1 g, manufactured by AMAKASU CHEMICAL INDUSTRIES), and the seed slurry 2 (997.2 g) were mixed. Further, L(+)-arginine (1.33 g) and 25% ammonia water (81.0 g, manufactured by Taiseikakou Co., Ltd.) were added, and the solution temperature was raised to 55° C. using a heater. The solution was stirred at 750 rpm, and ethyl orthosilicate (675.9 g) and a 6.5 mass % aqueous solution containing ammonium borate octahydrate (11.3 g, manufactured by Wako Pure Chemical Industries, Ltd.) were added thereto at a time over 240 minutes. The solution gradually became cloudy, and finally a translucent slurry 2 was obtained. Thereafter, the slurry 2 was concentrated to about 15 mass % using an UF film module "Microza" type ACP-1013D, manufactured by Asahi Kasei Corporation (fraction molecular weight of the ultrafiltration film: 13,000) at a flow rate of a liquid fed of 3660 ml/minute, followed by washing with water in an amount of 6 times the liquid volume, to thereby obtain a silica dispersion 2. The silica particles in the silica dispersion 2 obtained were amorphous.

Then, the same operation as in (iii) of Example 1 was performed to obtain silica dry powder 2, and the same operation was performed except that the temperature was raised to 1000° C. in (iv) of Example 1, to obtain a silica fired product 2. The silica fired product 2 obtained was amorphous. Further, the silica dry powder 2 and the silica fired product (fired powder) 2 were subjected to elemental analysis, and as a result, the boron decrement was 6.5%.

Example 3

(i) Preparation of Seed Particles (Seeds)

Seed particles were synthesized in the same manner as in Example 1.

(ii) Preparation of Silica Dispersion

Ion-exchanged water (339.1 g), an industrial alcohol preparation (Alcosol P-5, 764.5 g, manufactured by AMAKASU CHEMICAL INDUSTRIES), and the seed slurry 1 (554 g) were mixed. Further, L(+)-arginine (0.7 g) and 25% ammonia water (216.5 g, manufactured by Taiseikakou Co., Ltd.) were added, and the solution temperature was raised to 50° C. using a heater. The solution was stirred at 180 rpm, and a mixed solution containing ethyl orthosilicate (375.5 g) and triethyl borate (14.5 g, manufactured by Tokyo Chemical Industry Co., Ltd.) was added thereto over 240 minutes. The solution gradually became cloudy, and finally a cloudy slurry was obtained.

Then, the same operation as in (iii) of Example 1 was performed to obtain silica dry powder 3, and the same operation was performed except that the temperature was raised to 1000° C. in (iv) of Example 1, to obtain a silica fired product 3. The silica fired product 3 obtained was amorphous. Further, the silica dry powder 3 and the silica fired product (fired powder) 3 were subjected to elemental analysis, and as a result, the boron decrement was 10%.

Comparative Example 1

(i) Preparation of Seed Particles (Seeds)

Seed particles were synthesized in the same manner as in Example 1.

(ii) Preparation of Silica Dispersion

Ion-exchanged water (6392 g), an industrial alcohol preparation (Alcosol P-5, 7644 g, manufactured by AMAKASU CHEMICAL INDUSTRIES), and the seed slurry 1 (5540 g) were mixed. Further, L(+)-arginine (7 g) and 25% ammonia water (1664 g, manufactured by Taiseikakou Co., Ltd.) were added, and the solution temperature was raised to 40° C. using a heater. After stirring the solution at 120 rpm, ethyl orthosilicate (3753 g) was added over 240 minutes. The solution gradually became cloudy, and finally a translucent slurry was obtained.

Then, the same operation as in (iii) of Example 1 was performed to obtain comparative silica dry powder 1, and the same operation was performed except that the temperature was raised to 1000° C. in (iv) of Example 1, to obtain a comparative silica fired product 1. The comparative silica fired product 1 obtained was amorphous.

Comparative Example 2

(i) Preparation of Silica

Ethyl orthosilicate (119 g) and boron oxide (2 g, manufactured by Wako Pure Chemical Industries, Ltd.) were mixed with an industrial alcohol preparation (Alcosol P-5, 1184 g, manufactured by AMAKASU CHEMICAL INDUSTRIES) and dissolved therein. The solution was stirred at 300 rpm, and 25% ammonia water (10 g, manufactured by Taiseikakou Co., Ltd.) was added thereto, followed by stirring for 12 hours. The solution gradually became cloudy, and finally a cloudy slurry was obtained. When the cloudy slurry was left stand, the solid content settled.

Then, the same operation as in (iii) of Example 1 was performed to obtain comparative silica dry powder 2, and the same operation was performed except that the temperature was raised to 1000° C. in (iv) of Example 1, to obtain a comparative silica fired product 2. The comparative silica fired product 2 obtained was amorphous. Further, the boron content of the silica drying powder was measured, and as a result, no boron was detected.

Comparative Example 3

(i) Preparation of Silica

Boric acid (9.5 g, manufactured by Wako Pure Chemical Industries, Ltd.) was dissolved in pure water (101 g), and 25% ammonia water (1058 g) was further added therein. The resulting mixture was designated as a solution A. Ethyl orthosilicate (99.5 g) was mixed with an industrial alcohol preparation (595 g), and the resulting mixture was designated as a solution B. The solution A was stirred at 400 rpm, and the solution B was added thereto, followed by stirring for 30 minutes. A mixed solution composed of 25% ammonia water (1512 g) and pure water (838 g) was added thereto, and the resultant was stirred for 18 hours. The solution gradually became cloudy, and finally a cloudy slurry was obtained. When the cloudy slurry was left stand, the solid silica fired product obtained in each of Examples 1 to 3 and Comparative Examples 1 to 4.

TABLE 1

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| Boron concentration (mol % B/silica solid content) | 4.79 | 5.56 | 4.79 | 0 | 9.13 | 32.17 | 11.12 |
| Seed concentration (mol % seed/silica solid content) | 13.3 | 13.3 | 13.3 | 13.3 | 0 | 0 | 13.3 |
| $NH_3$ concentration (mol % $NH_3$/silica solid content) | 31.8 | 31.8 | 152.7 | 117.5 | 26.3 | 7899.3 | 27.5 |
| TEM average particle size (nm) | 29.9 | 28.8 | 35.5 | 28.3 | 40.3 | 821 | 125 |
| Coefficient of variation (TEM diameter) | 0.03 | 0.03 | 0.17 | 0.04 | 0.35 | 0.15 | 0.12 |
| Average circularity | 0.87 | 0.87 | 0.58 | 0.87 | 0.64 | 0.93 | 0.77 |
| Particle size distribution D50 (nm) | 31.3 | 28.6 | 32.3 | 31.5 | 41.3 | 1805 | 92.5 |
| Particle size distribution D100 (nm) | 60.4 | 70.0 | 80.4 | 61.5 | 1927 | 6526 | 1353 |
| Particle size distribution D90/D10 | 1.8 | 1.8 | 2.0 | 1.7 | 14.3 | 4.7 | 3.0 |
| Boron content in dry powder after ultrafiltration (proportion (mass %) of $B_2O_3$ in 100 mass % of a total of $SiO_2$ and $B_2O_3$) | 3.2 | 4.3 | 2.9 | 0 | 0 | 0 | 4.7 |
| Boron decrement after firing (%) | 8.3 | 6.5 | 10 | — | — | — | 11 |
| Fired powder SSA ($m^2$/g) | 2.4 | 2.2 | 3.1 | 120.3 | 68 | 15 | 30 |
| Relative dielectric constant ε (@1 GHz) | 2.9 | 3.0 | 2.9 | 3.5 | 3.0 | 3.5 | 3.1 |
| Q value (@ 1 GHz) | 2357 | 2450 | 2290 | 22 | 143 | 112 | 2385 | content settled. The slurry was passed through a 20 μm filter, and the slurry as the filtrate was collected.

Then, the same operation as in (iii) of Example 1 was performed to obtain comparative silica dry powder 3, and the same operation was performed except that the temperature was raised to 1000° C. in (iv) of Example 1, to obtain a comparative silica fired product 3. The comparative silica fired product 3 obtained was amorphous. Further, the boron content of the silica drying powder was measured, and as a result, no boron was detected.

Comparative Example 4

(i) Preparation of Seed Particles (Seeds)

Seed particles were synthesized in the same manner as in Example 1.

(ii) Preparation of Silica Dispersion

Ion-exchanged water (456.2 g), an industrial alcohol preparation (Alcosol P-5, 458.7 g, manufactured by AMAKASU CHEMICAL INDUSTRIES), and the seed slurry 1 (332.4 g) were mixed. Further, 25% ammonia water (81.0 g, manufactured by Taiseikakou Co., Ltd.) was added, and the solution temperature was raised to 45° C. using a heater. The solution was stirred at 490 rpm, and a mixed solution containing ethyl orthosilicate (225.3 g) and triethyl borate (23.4 g, manufactured by Tokyo Chemical Industry Co., Ltd.) was added thereto over 240 minutes. The solution gradually became cloudy, and finally a translucent slurry was obtained.

Then, the same operation as in (iii) of Example 1 was performed to obtain comparative silica dry powder 4, and the same operation was performed except that the temperature was raised to 1000° C. in (iv) of Example 1, to obtain a comparative silica fired product 4. The comparative silica fired product 4 obtained was amorphous. Further, the silica dry powder 4 and the silica fired product (fired powder) 4 were subjected to elemental analysis, and as a result, the boron decrement was 11%.

Table 1 shows the compositions of the raw materials and various physical properties of the silica dry powder and the It turned out that the silica drying powders 1 to 3 obtained in Examples 1 to 3 each had a small SSA value after firing and were excellent in terms of low temperature sinterability.

Figure 2:
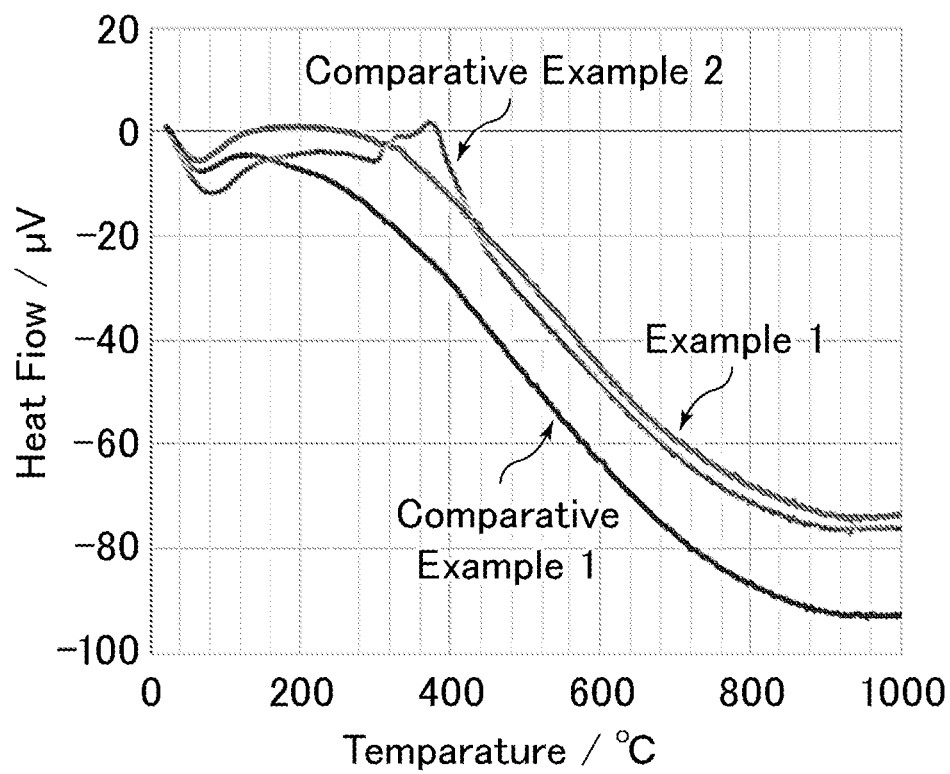
FIG. 2 shows the results of DTA analysis for the dry powder 1 obtained in Example 1 and the comparative dry powders 1 and 2 obtained in Comparative Examples 1 and 2.

For the drying powder 1 obtained in Example 1 and the comparative drying powders 1 and 2 obtained in Comparative Examples 1 and 2, FIG. 1 shows the results by TG analysis for thermal weight loss analysis, and FIG. 2 shows the results of DTA analysis.

As a result of thermal weight loss analysis, no weight loss due to heating was confirmed for the silica dry powder of Example 1 of the present application. It is considered that the weight loss in Comparative Example 2 is due to the residual organic portion of the raw materials because of condensation and particle formation before hydrolysis was completed. This suggests that the silica particles were sufficiently hydrolyzed in Example 1, so that the silica particles with less impurities were generated.

MLCC HALT Test

The powders obtained in Example 1 and Comparative Example 1 were used as MLCC materials and subjected to the HALT test. Each MLCC was produced by using $BaTiO_3$ as a base material and adding the powder obtained Example 1 or Comparative Example 1 in an amount of 0.1 wt % based on $BaTiO_3$. As a dopant, a Y—Dy—Mg—Mn—V-based dopant was used. The shape of the MLCC was 3225 size, and the interlayer thickness was 3 μm.

The MLCC produced was used for the HALT test. In the HALT test, the applied voltage was kept constant at 40 (V/μm), and the evaluation was made under the conditions of an acceleration temperature of 140° C. and an acceleration voltage of 128 V.

Figure 3:
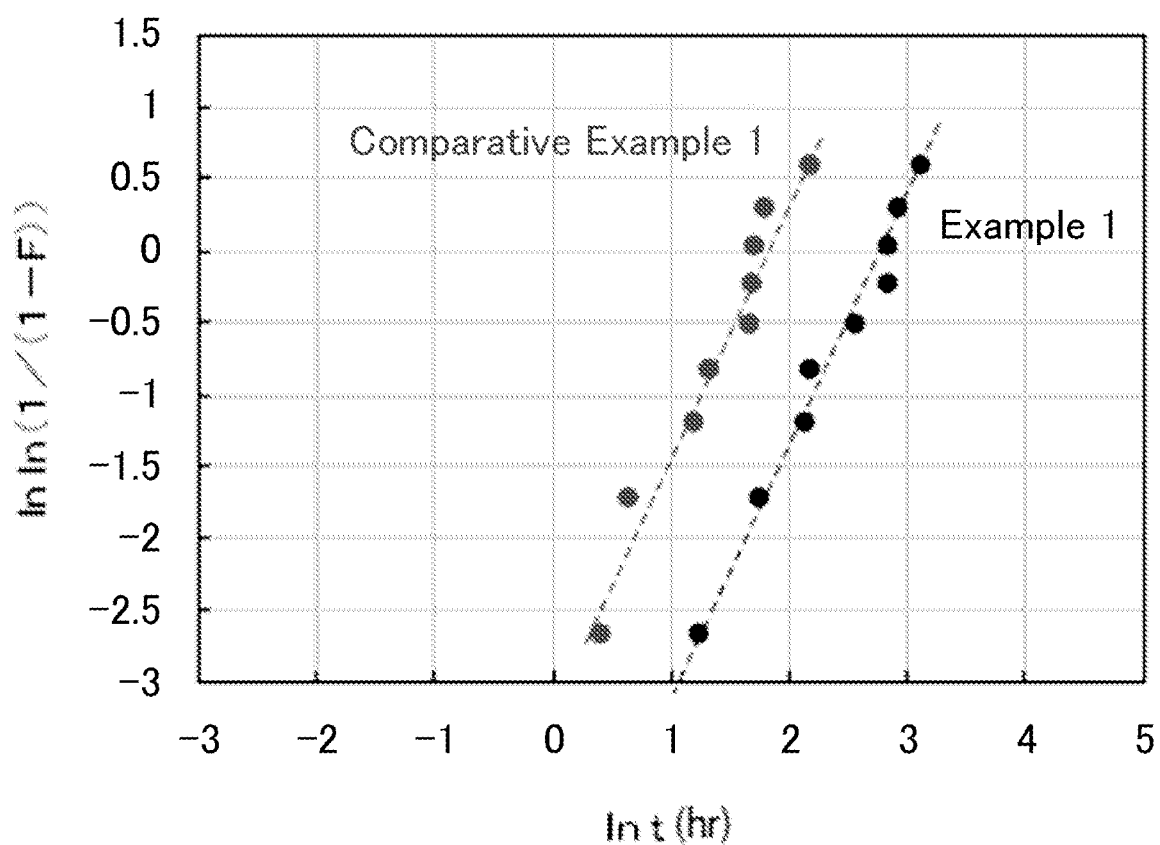
FIG. 3 shows the evaluation results of the HALT test for MLCCs using the dry powder 1 obtained in Example 1 and the comparative dry powder 1 obtained in Comparative Example 1.

Table 2 and FIG. 3 show the results. As is clear from Table 2 and FIG. 3, the boron-containing silica of Example 1 had excellent in terms of the mean time to failure (MTTF).

TABLE 2

|  | Name of sintering aid | Example 1 | Comparative Example 1 |
|---|---|---|---|
| MLCC design | Amount of sintering aid added (wt %) | 0.1 wt % based on BaTiO$_3$ | |
| | Dopant | Y-Dy-Mg-Mn-V system | |
| | Size | 3225 size | |
| | Interlayer thickness (μm) | 3 | |
| HALT test | Applied voltage (V/μm) | 40 | 40 |
| | Found interlayer thickness (μm) | 3.2 | 3.2 |
| | Acceleration voltage (V) | 128 | 128 |
| | Acceleration temperature (° C.) | 140 | 140 |
| | Mean time to failure MTTF (h) | 16.0 | 5.4 |

The invention claimed is:

1. An amorphous silica powder comprising boron atoms, the amorphous silica powder having an average particle size in a range from 10 to 100 nm, as determined from 40 particles selected at random in a transmission electron micrograph,
the amorphous silica powder having a decrement in a boron content in a range of 10 mass % or less, when fired under following conditions:
5 to 10 g of a dried product of the amorphous silica powder is filled into an alumina crucible, heated in an atmosphere at 200° C./hour to a temperature in a range from 1000° C. to 1100° C., maintained as is for 5 hours, and cooled to room temperature,
wherein the decrement is determined by a formula below:

the decrement (%)=(B$_2$O$_3$ content in the dried product of the amorphous silica powder–B$_2$O$_3$ content in a fired product of the amorphous silica powder)/(the B$_2$O$_3$ content in the dried product of the amorphous silica powder)×100.

2. The amorphous silica powder according to claim 1, wherein proportions of SiO$_2$ and B$_2$O$_3$ are in a range from 90.0 to 99.8 mass % and in a range from 0.2 to 10.0 mass %, respectively, in 100 mass % of a total of SiO$_2$ and B$_2$O$_3$, all in terms of oxide, in the amorphous silica powder.

3. The amorphous silica powder according to claim 1, wherein the amorphous silica powder has a coefficient of variation of a particle size, as a standard deviation of the particle size/the average particle size, in a range of 0.25 or less, as determined with 40 particles selected at random-in a transmission electron micrograph.

4. The boron-containing amorphous silica powder according to claim 1,
wherein the amorphous silica powder has an average circularity in a range of 0.65 or more, as determined by a following method:
a file of a transmission electron microscopy (TEM) image captured under a transmission electron microscope is read by an image analysis software, and an average circularity of 100 to 200 particles is determined by running an application for a particle analysis.

5. The amorphous silica powder according to claim 1,
wherein proportions of SiO$_2$ and B$_2$O$_3$ are in a range from 90.0 to 99.8 mass % and in a range from 0.2 to 10.0 mass %, respectively, in 100 mass % of a total of SiO$_2$ and B$_2$O$_3$, all in terms of oxide, when the amorphous silica powder is fired under the aforementioned conditions.

6. The amorphous silica powder according claim 1,
wherein when the amorphous silica powder is fired under the aforementioned conditions, the fired product has a specific surface area in a range of 5 m$^2$/g or less, as measured by the Brunauer-Emmett-Teller (BET) method with
an automatic specific surface area analyzer in a nitrogen atmosphere
under deaeration conditions for an external deaerator at 200° C. for 60 minutes.

7. The amorphous silica powder according to claim 1, wherein,
when the amorphous silica powder is fired under the aforementioned conditions, the fired product has a relative dielectric constant & at 1 GHz in a range of 5 or less and a Q value in a range of 1000 or more.

8. The fired product of the amorphous silica powder according to claim 1.

9. A method for producing the amorphous silica powder according to claim 1, the method comprising:
(A) obtaining seed particles comprising silicon atoms;
(B) mixing the seed particles comprising silicon atoms obtained in (A), a compound comprising a silicon atom that is different from the seed particles obtained in (A), and a compound comprising a boron atom; and
(C) drying the product obtained in (B).

10. The method for producing the amorphous silica powder according to claim 9,
wherein an amount of the compound comprising the boron atom used in the method is in a range from 0.4 to 10 mol %, in terms of a number of the boron atoms, based on 100 mol % of a total of the silicon atoms in the seed particles comprising the silicon atoms and the compound comprising the silicon atom that is different from the seed particles.

11. The method for producing the amorphous silica powder according to claim 9,
wherein an amount of the seed particles comprising the silicon atoms used is 1 to 20 mol %, in terms of a number of the silicon atoms, based on 100 mol % of a total of the silicon atoms in the seed particles comprising the silicon atoms and the compound comprising the silicon atom that is different from the seed particles.

12. The method for producing the amorphous silica powder according to claim 9,
wherein in (B), a basic catalyst is added in an amount in a range from 10 to 50 mol % based on 100 mol % of a total of the silicon atoms in the compound comprising the silicon atom that is different from the seed particles and the boron atoms in the compound comprising the boron atom.

* * * * *